May 13, 1924.
M. IGLESIAS
COFFEE MAKING MACHINE
Filed Jan. 28, 1922
1,493,984
2 Sheets-Sheet 1
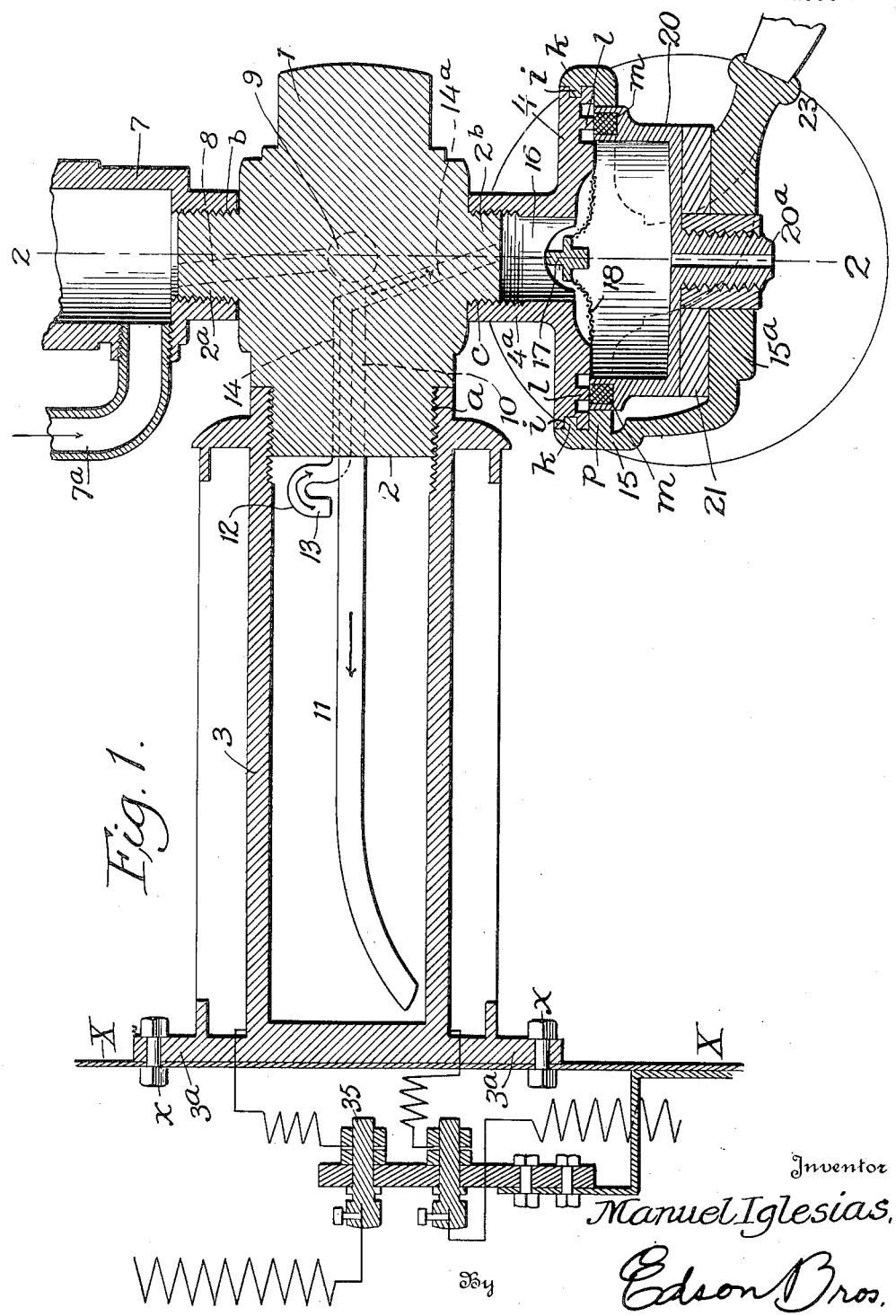
Inventor
Manuel Iglesias,
By Edson Bros.
Attorneys

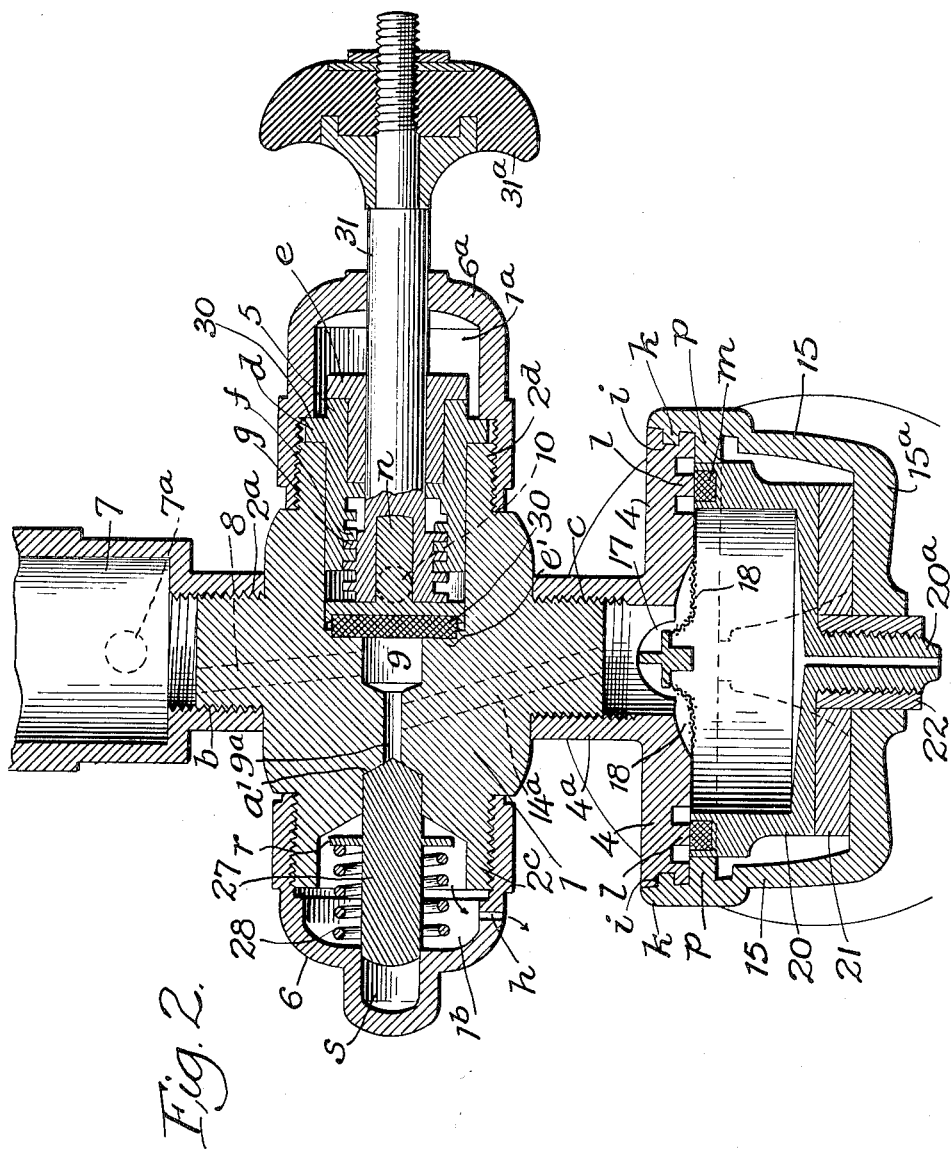

Patented May 13, 1924.

1,493,984

UNITED STATES PATENT OFFICE.

MANUEL IGLESIAS, OF BUENOS AIRES, ARGENTINA.

COFFEE-MAKING MACHINE.

Application filed January 28, 1922. Serial No. 532,391.

*To all whom it may concern:*

Be it known that MANUEL IGLESIAS, a citizen of the Republic of Argentina, residing at Buenos Aires, Argentina, has invented certain new and useful Improvements in Coffee-Making Machines, of which the following is a specification.

This invention relates to an electrically heated and instantly acting coffee making apparatus, more particularly adapted for making a single cup, or a small quantity of coffee beverage, at a time.

The object of my invention is to provide for instantly heating, by electric current, a small quantity of water, and to provide a specially constructed water inlet and discharge faucet, wherein a simple movement of a valve will admit water to the electrically heated boiler and cause discharge of hot water and steam therefrom to a container cup having a filter upon which is placed granular or powdered coffee, so that a coffee infusion may be quickly prepared as the hot water and steam are forced under pressure through the powdered coffee in said container.

Another object of the invention is to provide an improved construction of container and filter support for granular coffee, and mechanism for quickly connecting it to, and disconnecting it from, the water inlet and discharge faucet.

The principal parts of the apparatus are, an electrically heated boiler 3, preferably horizontal, a water inlet and discharge faucet 1, connected to one end of the boiler, and a coffee container and filter support 15, 20, adapted to be quickly connected to, and disengaged from, the faucet.

The matter constituting my invention will be defined in the claims.

I will now describe the details of construction of the apparatus by reference to the accompanying drawings, in which:—

Figure 1 represents a longitudinal vertical section.

Fig. 2 represents a vertical transverse section on line 2—2 of Fig. 1.

In my apparatus I provide a faucet body 1 having centrally at one side a boss 2, screw-threaded at $a$, also having an upper boss $2^a$, screw-threaded at $b$, and a lower boss $2^b$, screw-threaded at $c$. A cylindrical boiler 3, horizontally arranged, is connected at its screw-threaded inner end to the boss 2 and its outer end by flange $3^a$ and bolts and nuts $x$, to a suitable support X. The interior of the body is bored out at one end to form a valve receiving chamber $1^a$, Fig. 2, into which is fitted a hollow plug 5, having an annular flange $d$ which is held against an annular seat $2^d$ by an annular shoulder on the screw cap $6^a$. The plug 5 is hollow and has at its inner end an interior coarse or heavy screw-thread $f$ for engaging a similar thread $g$ on the valve stem 31. In the outer end of plug 5 is fitted a stuffing box $e$ around the valve steam 31. The opposite end of the body is bored to form a valve chamber $1^b$, in which is fitted a pressure regulating or relief valve 27 resting on a seat $a'$, and closing a steam escape passage $9^a$. The chamber $1^b$ is closed by a screw-cap 6, having a steam blow-off opening $h$.

To the upper boss $2^a$ is screwed the water-receiving chamber 7, having a water supply pipe $7^a$. In the body 1 and the boss $2^a$ is made an inlet passage 8, connecting chamber 7 with the interior chamber 9, which latter is a continuation of the valve chamber $1^a$. This chamber is provided with a valve seat $e'$ for the disk valve 30, which is secured by its rear stem $n$ in the main valve stem 31. In the body 1 is made a second water inlet passage 10 opening into the valve chamber at the rear of valve 30 when the latter is in the closed position as shown in Fig. 2. The opening of passage 10 is indicated by dotted lines in Fig. 2. When the valve 30 is retracted from its seat $e'$, the passage 10 will connect with chamber 9. The passage 10 extends out through the body 1 and its boss 2, Fig. 1, and has connecting with it the boiler feed pipe 11 which is curved, so that its discharge end is close to the bottom of the boiler, as shown in Fig. 1.

In the body 1, at one side of passage 10, is made a horizontal outlet passage 14, and to the left of chamber 9 is made a downwardly inclined passage $14^a$, leading from passage 14 down into the chamber 16 at the end of boss $2^b$. The passage $14^a$ connects also with the steam vent passage $9^a$, Fig. 2. To the outer end of passage 14 in boss 2 is connected a siphon elbow 12 having a passage 13 to provide for the outflow of water and steam to the filter cup 20.

A depending cup supporting member 4 is connected by its central screw-threaded neck 4ª, with the lower boss 2ᵇ, which is screw-threaded at c. This member forms a tight fitting cover for the filter cup, being provided in its periphery with a screw-like groove i, and at its under side with a depending annular rib l for cooperating with other parts to make a tight joint. A filter-cup holding frame or socket 15, preferably open at one side, as shown in Fig. 1, is provided at its upper edge with an inwardly projecting screw rib k, adapted to engage with the groove i in the member 4. The frame 15 is also provided with an inner annular rib p, which serves as a bearing for the filter cup 20. The groove i and rib k may be broken or interrupted like the grooves and ribs of a breech block in ordnance, so as to readily interlock and permit quick engagement of the parts. The frame 15 is provided with a thick strong base 15ª, having a central opening and a handle 23, Fig. 1. Upon the base is fitted a rotatable disk 21 having a central opening for receiving the adjusting nut 22. The filter cup 20 is provided at the bottom with a discharge nozzle 20ª which is externally screw-threaded for receiving the long adjusting nut 22. The upper edge of cup 20 is provided with a groove and packing m of rubber or other elastic material, adapted to make a tight joint with the depending rib l on the member 4. The rotatable disk 21 will rotate with the holding frame 15 when the latter is rotated to engage its rib k with the groove i in member 4, while the filter cup 20 will not rotate, but will simply be forced upward to press its packing ring m into tight contact with the rib l. The rubber or other packing is thus saved from wear and abrasion.

At the top of cup 20 is secured a perforated water distributing screen 18, in an opening of which is fitted a release member 17. This member is secured at the lower edge of the water discharge chamber 16 and is of such a form that it cannot pass out of the opening in the screen 18. In case chamber 16 becomes obstructed by any impurities flowing from the boiler 3, the member 17 will be forced upward, so that its point will pass into the chamber 16 and eject impurities deposited therein, thereby restoring the proper operation of the apparatus.

The pressure regulating, or relief, valve 27 in chamber 1ᵇ has a conical end resting on a seat a' at the steam vent passage 9ª, and is provided with a circular rib or flange r, against which bears a pressure spring 28 for holding the valve on its seat until forced outward by an excess pressure of steam. The rear end of the valve may be forced into a recess s, or through an opening in the end of the screw cap 6. Steam escapes from chamber 1ᵇ through vent h. The main valve stem 31 is provided with a detachable knob or handle 31ª and its inner end is secured to the valve disk 30 by means of a socket and a short stem n on the disk.

When it is desired to operate the apparatus for preparing a cup of coffee beverage, the valve stem 31 is turned to open the valve 30, when water will flow from chamber 7, through passage 8 into chamber 9, from which it passes to the passage 10 and from which it is discharged through feed pipe 11 into boiler 3. Air contained in the boiler will, at the same time, escape through passage 13 of siphon 12, passage 14 and 14ª to the exterior of the apparatus. When the water flowing into the boiler reaches the level of the passage 13 it passes therethrough to the exterior, following the same path as described for the air. The valve stem 31 is then rapidly turned in the opposite direction, which shuts off water from the boiler, the same being now filled. The electric current is now switched on to the resistance coils, thereby generating heat to quickly boil the water in boiler 3.

When the water boils it will generate steam which, as it accumulates in the top of the boiler, will cause pressure therein, and thereby force out the water through passages 13, 14 and 14ª, and chamber 16, until it reaches a level below the siphon 12. When the discharge of water ceases the water remaining in the boiler will produce steam, which will act upon the granular or pulverized coffee in the filter cup to distill off the essence, or make an infusion or coffee beverage. It will be understood that, at the right moment, after the air has been expelled from the boiler, the filter cup, with its charge of granular coffee, will be adjusted and held in place by the holding from 15.

By regulating the size of the siphon 12, its lower level will be higher or lower with respect to the bottom of the boiler 3, and therefore the quantity of water drawn from the boiler 3,—the quantity for making an instantaneous cup of coffee—may be calculated and regulated.

The resistance element in this type of apparatus is a metallic cylinder, in this case the boiler 3, on which the insulated resistance wire is wound. The poles of the electric circuit pass inside of the support X, Fig. 1, and are connected with the make and break contacts 35, consisting of two metal posts provided with binding screws and nuts for attachment of the electric poles. The make and break contacts 35 are the terminals of the apparatus by means of which the boiler is easily and quickly heated. The details of construction and arrangement of the electrical devices are well understood by electricians and need not be described herein.

An important feature of my invention is the provision of means for first discharging the required quantity of hot water and then a supply of steam under pressure from the boiler, for instantly preparing an infusion, decoction, or extract of coffee to form a beverage.

I claim:

1. In a coffee making apparatus, the combination with a boiler, a water supply chamber, and a filter chamber, of a faucet attached to said boiler and having a passage connecting said supply chamber to said boiler, and having a passage connecting said boiler to said filter chamber, a manually operated valve in said first named passage, an extension pipe leading from said first named passage into said boiler near the bottom thereof, and a siphon pipe connected to said second named passage and opening into said boiler above said extension pipe.

2. In coffee making apparatus, the combination with a horizontally supported cylindrical boiler, of a faucet attached to the outer end thereof and having therein water inlet passages, and water discharge passages, a controlling valve therefor, a water feed pipe and a discharge siphon in the boiler, connecting respectively with the inlet and discharge passages in the faucet, said feed pipe opening adjacent to the bottom of the boiler and the siphon opening at a point higher up in the boiler.

In testimony whereof he affixes his signature.

MANUEL IGLESIAS.